United States Patent Office 2,912,376
Patented Nov. 10, 1959

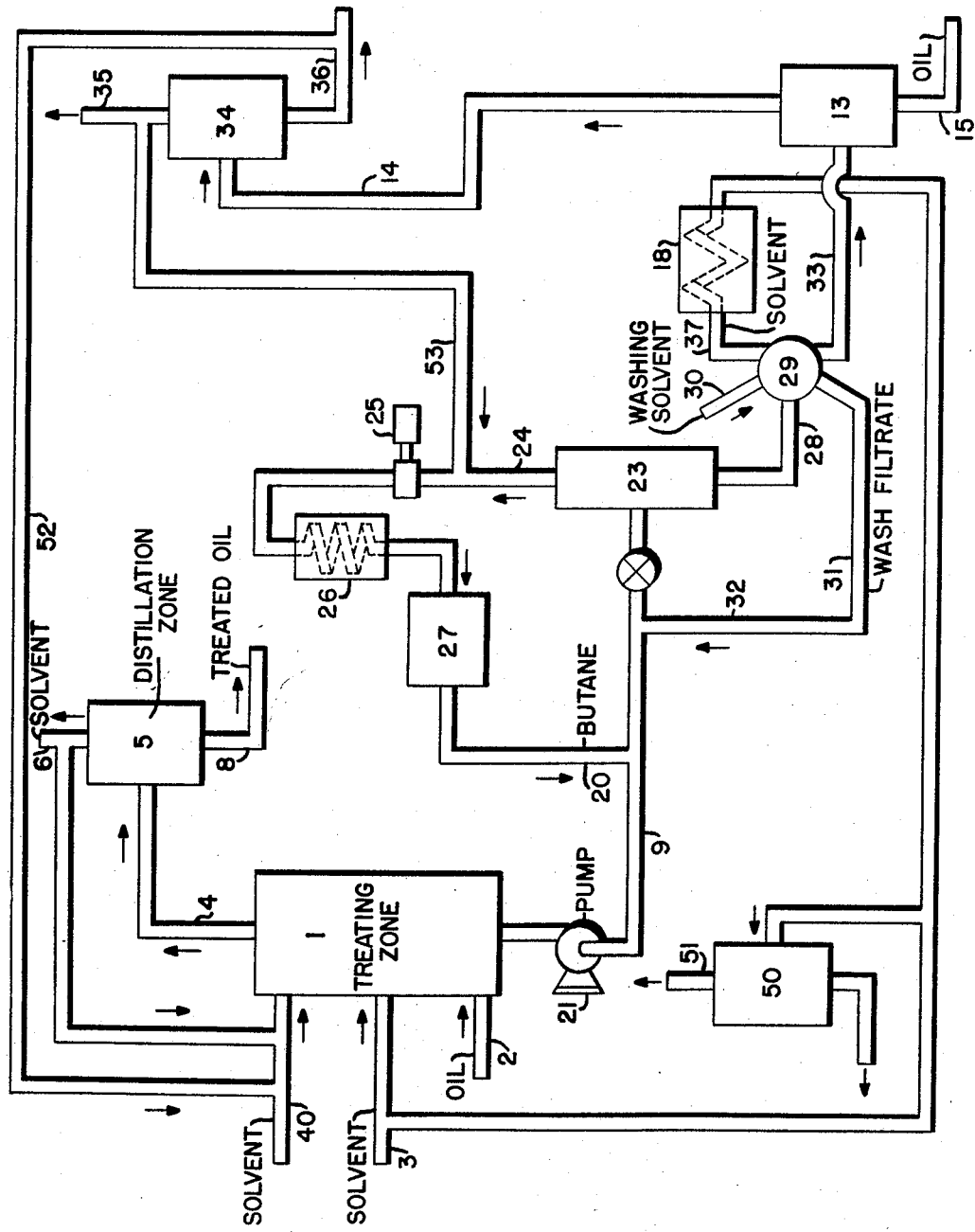

2,912,376

USE OF BUTANE DILUENT IN RECOVERY OF SPENT PHENOL FROM SOLVENT EXTRACT BY CRYSTALLIZATION

James D. Bushnell, Elizabeth, and Felix F. Doering, Jr., Scotch Plains, N.J., assignors to Esso Research and Engineering Company, a corporation of Delaware Application October 16, 1952, Serial No. 315,024

6 Claims. (Cl. 208—321)

The present invention is concerned with an improved process for the production of high quality lubricating oils. The invention is more particularly directed toward an improved liquid-liquid contacting process wherein solvents having a preferential selectivity for the more aromatic type constituents are utilized for the treatment of oil fractions. In accordance with the present invention, solvents of this character, as for example, phenol, are efficiently recovered by utilizing a partial crystallization operation in conjunction with a distillation operation. In accordance with the present invention, a low boiling hydrocarbon diluent is added to the solvent extract phase. This low boiling hydrocarbon acts as an auto refrigerant for cooling and crystallizing out the phenol and further acts as a diluent to aid in the removal of the crystals from the solution by filtration. The diluent is also used to wash the filter cake of occluded oil impurities.

It is well known in the art to contact hydrocarbon fractions with solvents having a preferential selectivity for the more aromatic type hydrocarbon constituents as compared to the more paraffinic type hydrocarbon constituents. Solvents of this character are for example, phenols, furfural, sulfur dioxide, nitrobenzene, aniline, cresols, chlorex, dimethylformamide, dipropionitriles, ammonia, amines, etc. It is also known in the art to use in conjunction with these aromatic type solvents, solvent-modifying agents as for example, water, alcohols, esters and the like. Temperatures usually employed in the solvent treating operations are in the range from about −40° F. to 250° F., while the solvent to oil ratios are in the range from about 0.4 to 10 volumes of solvent per volume of oil. These operations have been carried out either in batch or in countercurrent treating zone processes.

While the solvent treating operations, as described and known in the art, have been entirely satisfactory for segregating the desired fractions and for improving the viscosity index and other critical factors of oils such as lubricating oil and the like by the removal of aromatic type constituents, certain difficulties have been encountered. For instance, it has been relatively difficult and expensive to separate the solvent from the raffinate phase, and particularly from the solvent extract phase. While distillation is a conventional procedure, other methods have been suggested. Cooling of the respective phases has been utilized to separate a solvent-rich phase which is returned to the treating zone. This is not particularly desirable since not only does the solvent-rich phase contain a considerable amount of oil but also this retained oil is of a relatively high aromaticity content which is not suitable for returning to the treating zone.

It has also heretofore been suggested that the respective phases, particularly the solvent extract phase be cooled to crystallize the solvent such as phenol. This has seemed to be very desirable due to the large quantities of phenol used and the high latent heat of vaporization of phenol and other solvents which has necessitated the use of a large amount of equipment in order to secure satisfactory phenol recovery.

Recovery of phenol by crystallization from the spent phenol phase appears to be an attractive means of reducing the cost of phenol recovery, since the heat of fusion of phenol is only about one-fourth of its heat of vaporization. Furthermore, the crystallization can be carried out at temperatures of 50° to 100° F., which are relatively close to the temperatures at which the phenol phase leaves the bottom of the treater tower. However, heretofore it was necessary that a considerable amount of phenol be left in solution, in order to maintain a sufficiently low viscosity and sufficient liquid phase in order to permit efficient handling of the slurry.

It is the object of this invention to retain the thermodynamic advantages of phenol recovery by crystallization, and at the same time remove the practical limitations to crystallizing and filtering a very large portion of the phenol contained in the extract. The present invention consists of employing a low boiling solvent (such as butane) which functions as an auto refrigerant during the chilling step; a diluent for the filtration step; a wash medium for removing entrained oil from the filter cake; and as an absorbent for removing phenol from excess water brought into the system with the oil feed stock to the treater tower.

The process of the present invention may be readily understood by reference to the attached drawing illustrating embodiments of the same. Referring specifically to the drawing, a lubricating oil fraction is introduced into the bottom of countercurrent treating zone 1 by means of line 2. An aromatic type solvent, preferably a phenol, is introduced into the top of countercurrent treating zone 1 by means of line 40. In accordance with the procedure of the present invention, phenol secured as hereinafter described is introduced into treating zone 1 at a point below the point of introduction of the pure phenol by means of line 3. The quantity of phenol used for purposes of illustration is in the range from about 0.4 to 3 volumes of phenol per volume of oil. Temperature conditions in the countercurrent treating tower are in the range from about 110° F. to 250° F. It is preferred that the top temperature be in the range from about 130° F. to 250° F., while the temperature at the bottom of the tower be in the range from about 110° F. to 210° F. A raffinate phase comprising phenol and paraffinic type constituents is removed overhead from zone 1 by means of line 4 and passed to a distillation zone 5. Temperature and pressure conditions in distillation zone 5 are adapted to remove overhead by means of line 6 phenol which is preferably recycled to line 40. A high quality lubricating oil product is removed from the bottom of distillation zone 5 by means of line 8.

A solvent extract phase is removed from the bottom of extraction zone 1 by means of line 9 and mixed with a low boiling hydrocarbon as, for example, butane. The butane is introduced into the system at a pressure in the range from about 50 to 100 p.s.i.g. by means of line 20. Prior to introducing the butane into the solvent extract phase, the pressure on this stream is raised to a pressure in the range from about 50 to 100 p.s.i.g., by means of pump 21. The temperature is about 110° F. The mixture is passed through a pressure reducing valve 32 wherein the pressure is reduced from 50 to 100 p.s.i.g. to 10 to 30 p.s.i.g. The mixture is passed into a flash zone 23 wherein a large portion of the butane evaporates and is removed overhead by means of line 24. This butane is compressed by compressor 25, condensed in cooling zone 26 and passed to butane storage 27. Butane is recycled to the system from zone 27 by means of line 20.

The heat absorbed by the butane in evaporating cools the solution to a temperature at which the bulk of the phenol crystallizes. The temperature required to crystallize the phenol is in the range from about 50° to 100° F., depending upon the water content of the phenol. Under the conditions described, approximately 90% of the phenol is crystallized at a temperature of about 80° F.

The slurry of phenol crystals in a solution containing butane, extracted oil, and some liquid phenol is pumped by means of line 28 to a rotary pressure filter or equivalent means 29 wherein the precipitated phenol crystals are continuously separated from the solution. When a rotary filter is employed, as the phenol filter cake revolves to the upper part of the filter drum, it is sprayed with a stream of liquid butane which washes off any occluded oil particles. This butane for washing the phenol crystal cake is introduced into zone 29 by means of line 30. The washing butane filtrate is collected separately and returned to the flash chiller 23 as part of the refrigerant by means of line 31. The washed phenol crystals are removed from zone 29 by means of line 37 and passed to heater zone 18, wherein the same are re-melted and preferably recycled to zone 1 by means of line 3 as relatively pure phenol.

If desirable, these crystals may be passed into a vacuum flash drum 50 where any dissolved butane is flashed off at a low pressure and removed by means of line 51. The filtrate containing the extracted oil is removed from zone 29 by means of line 33, heated and passed to a distillation zone 13, wherein temperature and pressure conditions are adjusted to remove overhead by means of line 14 the remaining phenol and butane and to remove by means of line 15 an extract oil free of phenol and butane. The phenol-butane stream removed by means of line 14 is passed to a distillation zone 34 wherein temperature and pressure conditions are adjusted to segregate butane vapor which is removed by means of line 35 and phenol liquid which is removed by means of line 36. These streams are recycled to the system by means of lines 52 and 53 respectively.

The present invention is broadly concerned with an improved solvent treating operation wherein the solvent is efficiently recovered from the segregated phases. The method broadly comprises cooling the phase to precipitate the solvent which is separated from the liquid phase by filters, centrifuges or the like. The low boiling hydrocarbon diluent is a hydrocarbon containing preferably from 2 to 5 carbon atoms in the molecule. A preferred diluent comprises butane. The amount of diluent added and the amount flash vaporized will vary appreciably depending upon operating conditions. In general it is preferred to crystallize at least 80% of the solvent, preferably 90% of the solvent in zone 23.

What is claimed is:

1. Process for the segregation of the more aromatic type constituents from the more paraffinic type constituents of an oil which comprises contacting said oil in a treating zone with a solvent characterized by having a preferential selectivity for the more aromatic type constituents as compared to the more paraffinic type constituents under conditions to secure a raffinate phase and a solvent extract phase in a treating zone, said solvent being characterized by having a higher freezing point than said aromatic type constituents, segregating said raffinate phase and segregating the solvent therefrom, segregating the solvent extract phase and adding thereto a hydrocarbon diluent containing from 2 to 5 carbon atoms in the molecule, reducing pressure on said solvent extract phase to vaporize a substantial proportion of said diluent, whereby the solvent extract phase is chilled and a substantial proportion of said solvent crystallizes, passing said chilled solvent extract phase to a separation zone and removing from said solvent extract phase solvent crystals, reheating said crystals and recycling the solvent to said treating zone, distilling said latter solvent extract phase to remove overhead the remaining quantity of said solvent, and recycling said latter solvent to said treating zone at a point intermediate the point of introduction of said reheated crystals and the point of withdrawal of said raffinate phase.

2. Process as defined by claim 1 wherein said solvent extract phase withdrawn from said treating zone is subjected to an increase in pressure prior to the addition of said diluent.

3. Process as defined by claim 2 wherein at least 80% of said solvent is crystallized by chilling.

4. Process as defined by claim 3 wherein said crystals in said separation zone are washed with an additional quantity of said diluent and wherein the washed filtrate secured by this operation is subjected to an increase in pressure and recycled to the system at a point prior to the point at which the pressure on said solvent extract phase is reduced.

5. Process as defined by claim 1 wherein said diluent comprises butane.

6. Process as defined by claim 1 wherein said solvent comprises a phenol.

References Cited in the file of this patent

UNITED STATES PATENTS

| | | |
|---|---|---|
| 1,912,349 | Tuttle | May 30, 1933 |
| 2,201,120 | Bosing | May 14, 1940 |
| 2,216,933 | Atkins | Oct. 8, 1940 |
| 2,370,554 | Luten et al. | Feb. 27, 1945 |
| 2,484,834 | Keeling | Oct. 18, 1949 |
| 2,557,406 | Blazer et al. | June 19, 1951 |
| 2,570,044 | Benedict et al. | Oct. 2, 1951 |

OTHER REFERENCES

Dunstan et al.: The Science of Petroleum, volume III, pages 1877 and 1910 (1938). The Oxford University Press, New York.